US009224253B2

(12) United States Patent
Kakinuma

(10) Patent No.: US 9,224,253 B2
(45) Date of Patent: Dec. 29, 2015

(54) EXTERNAL DIAGNOSIS DEVICE, VEHICLE DIAGNOSIS SYSTEM AND VEHICLE DIAGNOSIS METHOD

(71) Applicant: HONDA MOTOR CO., LTD., Tokyo (JP)

(72) Inventor: Hiroyuki Kakinuma, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 3 days.

(21) Appl. No.: 14/399,677

(22) PCT Filed: Apr. 9, 2013

(86) PCT No.: PCT/JP2013/060666

§ 371 (c)(1),
(2) Date: Nov. 7, 2014

(87) PCT Pub. No.: WO2013/168499

PCT Pub. Date: Nov. 14, 2013

(65) Prior Publication Data

US 2015/0112541 A1 Apr. 23, 2015

(30) Foreign Application Priority Data

May 9, 2012 (JP) ................................ 2012-107168

(51) Int. Cl.

*G01M 17/00* (2006.01)
*G07C 5/08* (2006.01)
*G07C 5/00* (2006.01)

(52) U.S. Cl.

CPC .............. *G07C 5/0808* (2013.01); *G07C 5/008* (2013.01); *G07C 2205/02* (2013.01)

(58) Field of Classification Search

CPC .. G07C 5/0808; G07C 5/008; G06F 11/2294; B60W 2050/043

See application file for complete search history.

(56) References Cited

U.S. PATENT DOCUMENTS

| | | | |
|---|---|---|---|
| 5,790,965 | A | 8/1998 | Abe |
| 2005/0190468 | A1 | 9/2005 | Noguchi |

FOREIGN PATENT DOCUMENTS

| | | | |
|---|---|---|---|
| JP | 07-43299 | B2 | 5/1995 |
| JP | 2004-020461 | A | 1/2004 |
| JP | 2005-240770 | A | 9/2005 |

OTHER PUBLICATIONS

International Search Report dated Jun. 4, 2013 corresponding to International Patent Application No. PCT/JP2013/060666 and English translation thereof.

*Primary Examiner* — Michael D Lang

(74) *Attorney, Agent, or Firm* — Squire Patton Boggs (US) LLP

(57) ABSTRACT

In an external diagnosis device, a vehicle diagnosis method and a vehicle diagnosis system, when an IGSW is on, power is supplied from a vehicle-mounted power supply to the external diagnosis device, and a capacitor provided on the external diagnosis device is charged, and when the IGSW is turned off, the power supply from the vehicle-mounted power supply to the external diagnosis device is stopped, and power is supplied from the capacitor to the external diagnosis device.

6 Claims, 5 Drawing Sheets

60

60

EXTERNAL DIAGNOSIS DEVICE, VEHICLE DIAGNOSIS SYSTEM AND VEHICLE DIAGNOSIS METHOD

TECHNICAL FIELD

The present invention relates to an external diagnosing apparatus for diagnosing a vehicle, a vehicle diagnosing system, and a vehicle diagnosing method.

BACKGROUND ART

If a vehicle suffers from a fault, the vehicle is taken to a repair shop of a dealer or the like. The operator (technician) who is responsible for repairing the vehicle connects an electronic control unit (hereinafter referred to as an "ECU") on the vehicle to an external diagnosing apparatus, reads fault data (trouble codes) from the ECU, analyzes a defective component or a fault source, and repairs or adjusts the vehicle.

External diagnosing apparatus of the above type usually have an internal power supply. However, certain external diagnosing apparatus exist that are free of an internal power supply for the purpose of making the external diagnosing apparatus smaller, lighter, or lower in cost (see U.S. Pat. No. 5,790,965, hereinafter referred to as "U.S. Pat. No. 5,790,965 A"). According to U.S. Pat. No. 5,790,965 A, an adapter harness 34 of a portable diagnosing apparatus 100 is connected to a connector 2*a* of an electronic control unit 300 on a vehicle 200. When a power supply switch 35 (FIG. 1) of the portable diagnosing apparatus 100 is turned on, a battery $V_B$ on the vehicle 200 supplies electric power to the portable diagnosing apparatus 100 (see column 3, lines 22 through 27, column 4, lines 22 through 29, FIG. 2).

SUMMARY OF INVENTION

According to U.S. Pat. No. 5,790,965 A, as described above, electric power used by the portable diagnosing apparatus 100 is supplied from the battery $V_B$ on the vehicle 200.

Relatively small vehicles such as motorcycles or the like usually have a battery that is smaller in capacity than batteries used in relatively large vehicles such as four-wheeled vehicles or the like. Therefore, when electric power that is used by an external diagnosing apparatus is supplied from a battery on a vehicle, it is preferable to minimize the amount of electric power that is used by the external diagnosing apparatus. In this regard, according to U.S. Pat. No. 5,790,965 A, the power supply switch 35 of the portable diagnosing apparatus 100 is used to selectively supply and stop supply of electric power from the battery $V_B$ to the portable diagnosing apparatus 100. When the power supply switch 35 is used, the user makes a judgment concerning the timing at which the power supply switch 35 is turned on each time that the power supply switch 35 is operated. Therefore, unless the power supply switch 35 is appropriately operated at the time of starting and ending a diagnostic process, unnecessary electric power may be consumed.

The present invention has been made in view of the above circumstances. An object of the present invention is to provide an external diagnosing apparatus, a vehicle diagnosing system, and a vehicle diagnosing method, which are capable of reducing electric power consumed by a vehicle-mounted power supply while at the same time reducing the size, weight, and cost of the vehicle-mounted power supply.

According to the present invention, there is provided an external diagnosing apparatus for performing data communications with an electronic control unit, hereinafter referred to as an ECU, mounted on a vehicle from outside of the vehicle, acquiring sensor detected values of the vehicle through the ECU, and diagnosing the vehicle, comprising an external-diagnosing-apparatus-side electric power line connected to a vehicle-side electric power line, the vehicle-side electric power line configured to supply electric power from a vehicle-mounted power supply to the external diagnosing apparatus when an ignition switch of the vehicle is on, and configured to stop supply of electric power from the vehicle-mounted power supply when the ignition switch is off, a capacitor being connected to the external-diagnosing-apparatus-side electric power line and storing electric power, the capacitor being charged with electric power from the vehicle-mounted power supply when the ignition switch is on, and supplying the charged electric power to the external diagnosing apparatus after the ignition switch has been turned off, a requested job input unit having input thereto a requested job for the external diagnosing apparatus, a memory-related job judging section configured to judge whether or not the requested job input to the requested job input unit is a memory-related job that needs to activate a memory check program of the ECU, and a time limit display unit configured to display an operation interval time limit after the ignition switch has been turned off and until the ignition switch is subsequently turned on again in order to restart the ECU, in a case that the memory-related job judging section judges that the requested job is the memory-related job and in a case that the requested job is finished.

According to the present invention, when the ignition switch is on, electric power is supplied from the vehicle-mounted power supply to the external diagnosing apparatus. Therefore, it is unnecessary for a normal use power supply to be included in the external diagnosing apparatus per se, thereby making it possible to reduce the size, weight, and cost of the external diagnosing apparatus. When the ignition switch is off, supply of electric power from the vehicle-mounted power supply to the external diagnosing apparatus is stopped. Further, when the ignition switch is off, the ECU on the vehicle also is turned off, and the external diagnosing apparatus usually does not acquire sensor detected values from the vehicle and does not perform a vehicular diagnosis. Consequently, when the ignition switch is off, supply of electric power from the vehicle-mounted battery to the external diagnosing apparatus is stopped, thereby making it possible to efficiently reduce consumption of electric power of the vehicle-mounted power supply.

According to the present invention, furthermore, the external diagnosing apparatus includes the capacitor, which is charged with electric power from the vehicle-mounted power supply when the ignition switch is on, and the capacitor supplies the charged electric power to the external diagnosing apparatus after the ignition switch has been turned off. Therefore, when the ignition switch is turned off at the time of completion of the process of collecting data from the vehicle, the process of writing data into the external diagnosing apparatus is continued until completion thereof, because the external diagnosing apparatus keeps operating for a predetermined period of time (e.g., ranging from 10 seconds to 15 seconds).

In the case that the external diagnosing apparatus is operated only during a temporary time interval after the ignition switch has been turned off and until the ignition switch is subsequently turned on again to restart the ECU, if the time interval after the ignition switch has been turned off and until the ignition switch is subsequently turned on again is unduly long, then supply of electric power from the capacitor tends to stop while the ignition switch is off, thus turning the external diagnosing apparatus off. In this case, even when supply of electric power to the external diagnosing apparatus is resumed by subsequently turning on the external diagnosing apparatus, it takes time for the external diagnosing apparatus to be restarted, resulting in an interruption of the entire process. According to the present embodiment, if a job requested on the external diagnosing apparatus is a memory-related job, which needs to activate a memory check program of the ECU, then an operation interval time limit (set in the range of the an operable time of the external diagnosing apparatus, which is determined from a remaining capacity or a charging rate of the capacitor) is displayed after the ignition switch has been turned off and until the ignition switch is subsequently turned on again at the time of completion of the requested job. Consequently, the user is prompted to turn off the ignition switch and subsequently turn on the ignition switch again (in order to restart the ECU) before supply of electric power from the capacitor is stopped, thereby making it possible to promote smooth continuation of the job.

A remaining capacity or a charging rate of the capacitor may be detected when the requested job is finished, and in a case that the charging rate or the remaining capacity is less than a first threshold value, a message for inhibiting the ignition switch from being turned off may be displayed until the capacitor has been charged to the first threshold value or greater. Accordingly, it is possible to prompt the user not to turn off the ignition switch and to turn on the ignition switch for restarting the ECU during a time interval after the ignition switch is initially turned on and until the capacitor is charged to the first threshold value or greater. Alternatively, it is possible to advise the user against turning off the ignition switch until the capacitor is charged to the first threshold value or greater, if the capacitor has been discharged, thus causing a shortage of the remaining capacity or the charging rate, when the ECU is not suitably restarted and hence an attempt to restart the ECU needs to be repeated. Therefore, it is possible to reduce the risk of interrupting the job for the purpose of restarting the external diagnosing apparatus after the external diagnosing apparatus has been turned off, due to the fact that supply of electric power from the capacitor is stopped while the ignition switch is turned off.

The operation interval time limit may be variable depending on an operable time of the external diagnosing apparatus, which is determined from the remaining capacity or the charging rate of the capacitor. Further, after completion of the requested job, the remaining capacity or the charging rate of the capacitor may be detected continuously or intermittently, and display of the operation interval time limit may be changed depending on a change in the remaining capacity or the charging rate. Thus, it is possible to display the operation interval time limit depending on a change in the remaining capacity or the charging rate. Consequently, it is possible to make the user recognize a change in the operable time of the external diagnosing apparatus.

After the ignition switch has been turned off, the display of the operation interval time limit may be changed as the operable time decreases. Therefore, after the ignition switch has been turned off, it is possible for the user to accurately grasp the operable time as the operable time decreases.

According to the present invention, there also is provided a vehicle diagnosing system for performing data communications between an electronic control unit, hereinafter referred to as an ECU, mounted on a vehicle and an external diagnosing apparatus, so that the external diagnosing apparatus acquires sensor detected values of the vehicle from the vehicle and diagnoses the vehicle. Electric power is supplied from a vehicle-mounted power supply of the vehicle to the external diagnosing apparatus when an ignition switch of the vehicle is on, and supply of electric power from the vehicle-mounted power supply is stopped when the ignition switch is off. In addition, the external diagnosing apparatus has a capacitor configured to store electric power, the capacitor being charged with electric power from the vehicle-mounted power supply when the ignition switch is on, and supplying the charged electric power to the external diagnosing apparatus after the ignition switch has been turned off. Also, the external diagnosing apparatus has a display unit configured to display a warning in order not to turn off the ignition switch under a condition in which the ignition switch is required to be turned off to restart the ECU, depending on a remaining capacity or a charging rate of the capacitor when the ignition switch is on.

According to the present invention, when the ignition switch is on, electric power is supplied from the vehicle-mounted power supply to the external diagnosing apparatus. Therefore, it is unnecessary for a normal use power supply to be included in the external diagnosing apparatus per se, thereby making it possible to reduce the size, weight, and cost of the external diagnosing apparatus. When the ignition switch is off, supply of electric power from the vehicle-mounted power supply to the external diagnosing apparatus is stopped. Further, when the ignition switch is off, the ECU on the vehicle also is turned off, and the external diagnosing apparatus usually does not acquire sensor detected values from the vehicle and does not perform a vehicular diagnosis. Consequently, when the ignition switch is off, supply of electric power from the vehicle-mounted battery to the external diagnosing apparatus is stopped, thereby making it possible to efficiently reduce consumption of electric power of the vehicle-mounted power supply. Therefore, the vehicle-mounted power supply can be used efficiently.

According to the present invention, furthermore, the external diagnosing apparatus includes the capacitor, which is charged with electric power from the vehicle-mounted power supply when the ignition switch is on, and the capacitor stores electric power to supply the charged electric power to the external diagnosing apparatus after the ignition switch has been turned off. Therefore, when the ignition switch is turned off at the time of completion of the process of collecting data from the vehicle, the process of writing data into the external diagnosing apparatus is continued until completion thereof, because the external diagnosing apparatus keeps operating for a predetermined period of time (e.g., ranging from 10 seconds to 15 seconds).

In the case that the external diagnosing apparatus is operated only during a temporary time interval after the ignition switch has been turned off and until the ignition switch is subsequently turned on again to restart the ECU, the external diagnosing apparatus is capable of being operated in such a way.

According to the present invention, there is further provided a vehicle diagnosing method of performing data communications between an electronic control unit, hereinafter referred to as an ECU, mounted on a vehicle and an external diagnosing apparatus, so that the external diagnosing apparatus acquires sensor detected values of the vehicle from the vehicle and diagnoses the vehicle, comprising the steps of supplying electric power from a vehicle-mounted power supply to the external diagnosing apparatus and charging a capacitor of the external diagnosing apparatus when an ignition switch of the vehicle is on, stopping supply of electric power from the vehicle-mounted power supply to the external diagnosing apparatus, and supplying electric power from the capacitor to the external diagnosing apparatus when the ignition switch is off, accepting a requested job by the external diagnosing apparatus, judging by the external diagnosing apparatus whether or not the accepted requested job is a memory-related job that needs to activate a memory check program of the ECU, carrying out the requested job by the external diagnosing apparatus, and displaying, on a display unit of the external diagnosing apparatus, an operation interval time limit, which is a time limit after the ignition switch has been turned off and until the ignition switch is subsequently turned on again in order to restart the ECU, in a case that the requested job is judged as the memory-related job and the requested job is finished, and which is a time set in a range of an operable time of the external diagnosing apparatus that is determined from a remaining capacity or a charging rate of the capacitor.

DESCRIPTION OF EMBODIMENTS

A. Embodiment

[1. Configuration]

(1-1. Overall Configuration)

Figure 1:
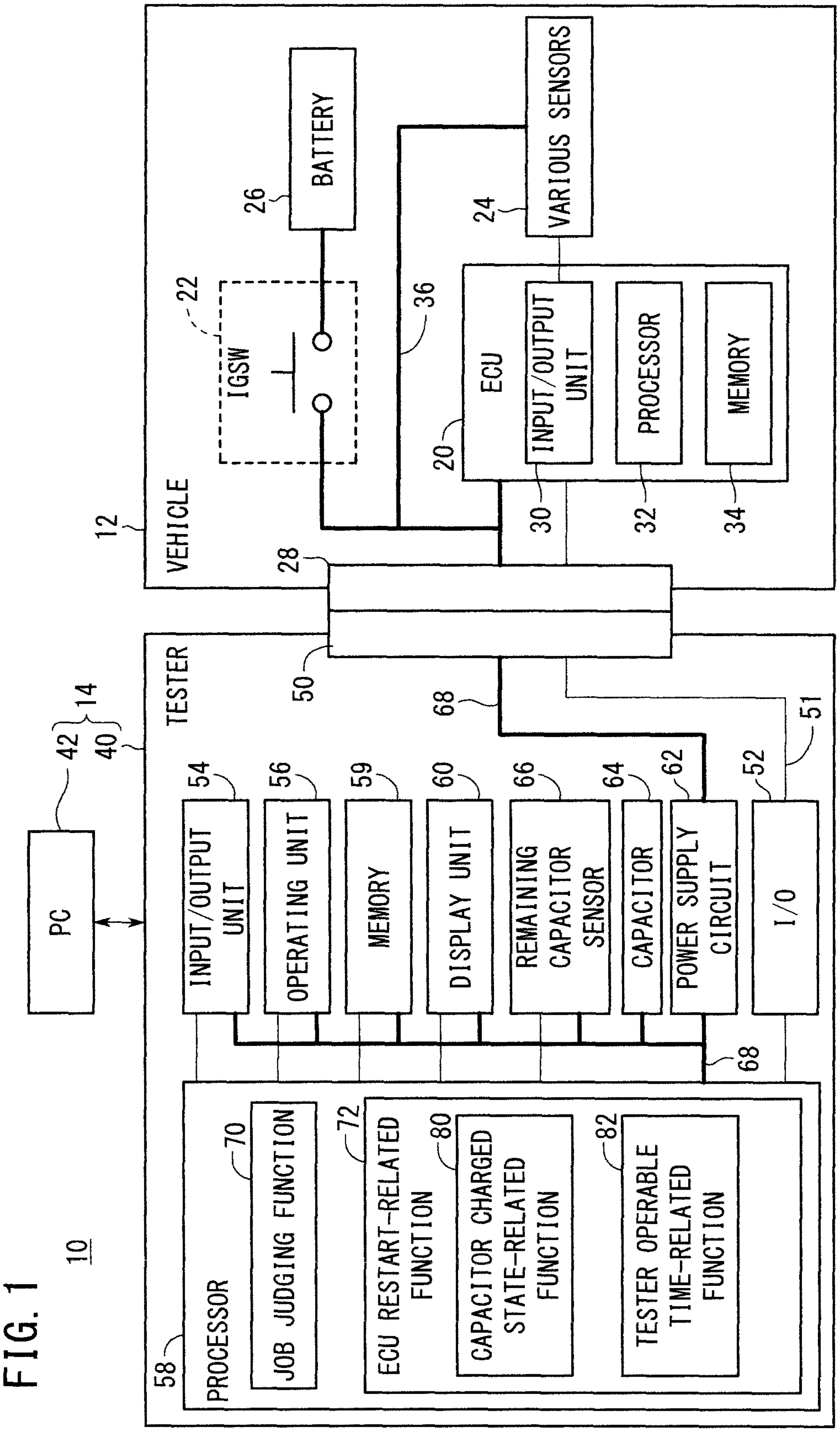
FIG. 1 is a block diagram showing a general configuration of a vehicle diagnosing system incorporating an external diagnosing apparatus according to an embodiment of the present invention.

FIG. 1 is a block diagram showing a general configuration of a vehicle diagnosing system 10 (hereinafter also referred to as a "system 10") incorporating an external diagnosing apparatus 14 according to an embodiment of the present invention. The system 10 is a motorcycle diagnosing system having a vehicle 12 (a motorcycle according to the present embodiment) as a diagnostic target, and an external diagnosing apparatus 14 for making various diagnoses (a fault diagnosis, a deterioration diagnosis, etc.) on the vehicle 12 from outside of the vehicle 12.

(1-2. Vehicle 12)

The vehicle 12 according to the present embodiment is a gasoline vehicle. As described later, the vehicle 12 may alternatively be a vehicle such as a diesel engine vehicle, an electric automobile, a hybrid vehicle, or the like. Although the vehicle 12 according to the present embodiment is illustrated as a motorcycle, the vehicle may be a three-wheeled vehicle, a four-wheeled vehicle, a six-wheeled vehicle, or the like.

The vehicle 12 includes an electronic control unit 20 (hereinafter referred to as an "ECU 20"), an ignition switch 22 (hereinafter referred to as an "IGSW 22") for controlling ON and OFF states of the ECU 20, various sensors 24, a vehicle-mounted battery 26 (hereinafter also referred to as a "battery 26"), and a vehicle-side connector 28 (hereinafter referred to as a "connector 28") that comprises a data link connector. The ECU 20 controls an engine, a transmission, a brake, etc., not shown, and, as shown in FIG. 1, includes an input/output unit 30, a processor 32, and a memory 34.

The various sensors 24 include, for example, an engine rotational speed sensor for detecting the engine rotational speed, and a coolant temperature sensor for detecting the temperature of an engine coolant.

The battery 26 supplies electric power to various components of the vehicle 12, including the ECU 20 and the various sensors 24, through a vehicle-side electric power line 36 (hereinafter also referred to as an "electric power line 36"). In addition, the battery 26 supplies electric power to a tester 40 of the external diagnosing apparatus 14 through the electric power line 36 and the connector 28.

The IGSW 22 is connected between the ECU 20, the various sensors 24 and the tester 40, and the battery 26. When the IGSW 22 is turned on, electric power is supplied to the ECU 20, the various sensors 24, and the tester 40. On the other hand, when the IGSW 22 is turned off, electric power is not supplied to the ECU 20, the various sensors 24, and the tester 40.

(1-3. External Diagnosing Apparatus 14)

(1-3-1. General)

The external diagnosing apparatus 14 includes a personal computer 42 (hereinafter referred to as a "PC 42") in addition to the tester 40. The external diagnosing apparatus 14 is capable of performing various diagnoses on the vehicle 12, and also is capable of writing data, erasing data, and rewriting programs in the memory 34 of the ECU 20.

(1-3-2. Tester 40)

The tester 40 is used in various diagnoses (examinations) as a communications interface, and is connected to the ECU 20 on the vehicle 12 at a dealer, a repair shop, or the like, so that the tester 40 can read data from the vehicle 12. Although the tester 40 has a processing capability as well as a storage capacity that are smaller than those of the PC 42, the tester 40 is smaller in size and can easily be carried around. The tester 40 per se is capable of performing various diagnoses (examinations) on the vehicle 12 using the various data (sensor detected values) read from the vehicle 12. In addition, the tester 40 is capable of saving the various data that are read, and can send the data to the PC 42. The tester 40 also is capable of writing data, erasing data, and rewriting programs in the memory 34 of the ECU 20.

As shown in FIG. 1, the tester 40 has a tester-side connector 50 (hereinafter referred to as a "connector 50") for connecting to the ECU 20 on the vehicle 12, an input/output circuit 52 for inputting and outputting signals to and from the vehicle 12, the input/output circuit 52 being connected to a tester-side signal line 51 (hereinafter referred to as a "signal line 51") that extends from the connector 50, an input/output unit 54 for inputting and outputting signals to and from the PC 42, an operating unit 56 for accepting inputs from the user, a processor 58 for controlling various components of the tester 40, a memory 59 for storing various programs and data, including a control program used by the processor 58, a rewriting program for the ECU 20, etc., and data associated therewith, a display unit 60, a power supply circuit 62, a capacitor 64, and a remaining capacity sensor 66.

When a non-illustrated wire harness (including signal and electric power lines) is connected to the input/output unit 54, the input/output unit 54 inputs and outputs signals to and from the PC 42, and supplies electric power from the PC 42 to various components of the tester 40 through a tester-side electric power line 68 (hereinafter referred to as an "electric power line 68").

The operating unit 56 (requested job input unit) has operating buttons, etc., for sending output commands (quasi signals) to the ECU 20 on the vehicle 12 or to the various sensors 24 as needed.

The processor 58 includes a job performing function 70 and an ECU restart-related function 72 (hereinafter also referred to as a "restart-related function 72"). The job performing function 70 (memory-related job judging section) is a function to carry out various jobs (a diagnosing job, a program rewriting job, etc.), which are required in the tester 40, through the operating unit 56, and also is a function to carry out various jobs that have been requested by the user. The diagnosing job includes a job for collecting various data (sensor output values) from the vehicle 12 through the ECU 20, and for saving the collected data in the memory 59.

The restart-related function 72 is a function to perform a control process related to restarting of the ECU 20 when a job is carried out that requires the memory 34 of the ECU 20 to perform a memory check. The restart-related function 72 has a capacitor charged state-related function (hereinafter also referred to as a "charged state-related function 80"), and a tester operable time-related function 82 (hereinafter also referred to as an "operable time-related function 82").

The charged state-related function 80 is a function to perform a control process related to the charged state of the capacitor 64 at the time that the ECU 20 is restarted. The operable time-related function 82 is a function to perform a control process related to the operable time of the tester 40, which is set depending on the remaining capacity or the charging ratio of the capacitor 64. Details of the respective functions 72, 80, and 82 will be described in detail later with reference to FIG. 3, etc.

The display unit 60 (time limit display unit) displays various pieces of information such as data that is read from the ECU 20 on a display monitor.

The power supply circuit 62 is connected to the vehicle-mounted battery 26 through the tester-side electric power line 68 (external diagnosing apparatus-side electric power line), the connector 50, and the vehicle-side electric power line 36. The power supply circuit 62 also is connected to various components of the tester 40 through the electric power line 68. The power supply circuit 62 comprises a step-down device, such as a regulator, a DC/DC converter, or the like, which steps down the output voltage from the battery 26 (from 12 V to 5 V, for example), and supplies the stepped-down electric power to the various components of the tester 40.

When the IGSW 22 is turned on, the capacitor 64 is charged with electric power, which is supplied from the battery 26 through the power supply circuit 62. When the IGSW 22 is turned off, the capacitor 64 supplies electric power, which has been charged to the capacitor 64 thus far, to the various components of the tester 40.

According to the present embodiment, the capacitor 64 comprises a so-called ultracapacitor, which is referred to as an electric double-layer capacitor. Although the capacitor 64 has a relatively large capacity for a capacitor, when the tester 40 performs a job such as a diagnosing job, electric power supplied from the capacitor 64 alone is insufficient. In other words, the capacitor 64 according to the present embodiment is only capable of storing electric power that is needed to maintain the tester 40 in an on state during a period of time in which the IGSW 22 is turned off and subsequently turned on again in order to restart the ECU 20 (e.g., during a period of time represented by a value between 5 seconds and 15 seconds). Therefore, under normal operation of the tester 40, when performing a diagnosing job or a process of rewriting a program for the ECU 20, etc., electric power that is consumed by the tester 40 is supplied from the vehicle-mounted battery 26.

The remaining capacity sensor 66 detects the remaining capacity of the capacitor 64, and outputs the detected remaining capacity to the processor 58. According to the present embodiment, the capacitor 64 and the remaining capacity sensor 66 are included as built-in devices in the tester 40. However, the capacitor 64 and the remaining capacity sensor 66 may also be connected as external devices to the tester 40.

(1-3-3. PC 42)

The PC 42 has an input/output unit, an operating unit, a processor, a memory, and a display unit, not shown. The hardware configuration of the PC 42 may be in the form of a commercially available laptop personal computer, for example.

For performing a job such as a diagnosing job on the vehicle 12 using the tester 40, a desired diagnosing program, a rewriting program for the ECU 20, and data, etc., are sent beforehand from the PC 42 to the tester 40, and the programs and data are stored in the memory 59 of the tester 40. Data of the vehicle 12, which are acquired by the tester 40, are sent from the tester 40 to the PC 42, and such data are stored in the memory of the PC 42.

As described above, communications between the tester 40 and the PC 42 are carried out through communication lines in the non-illustrated wire harness (e.g., a USB cable).

As described above, the tester 40 has only the capacitor 64 as the power supply thereof, and the capacitor alone is incapable of keeping the tester 40 active during normal operation. When the tester 40 and the PC 42 communicate with each other, the PC 42 supplies the tester 40 with electric power through the electric power lines in the wire harness.

[2. Supply of Electric Power to the Tester 40]

Supply of electric power to the tester 40 will be described in further detail below.

Figure 2:
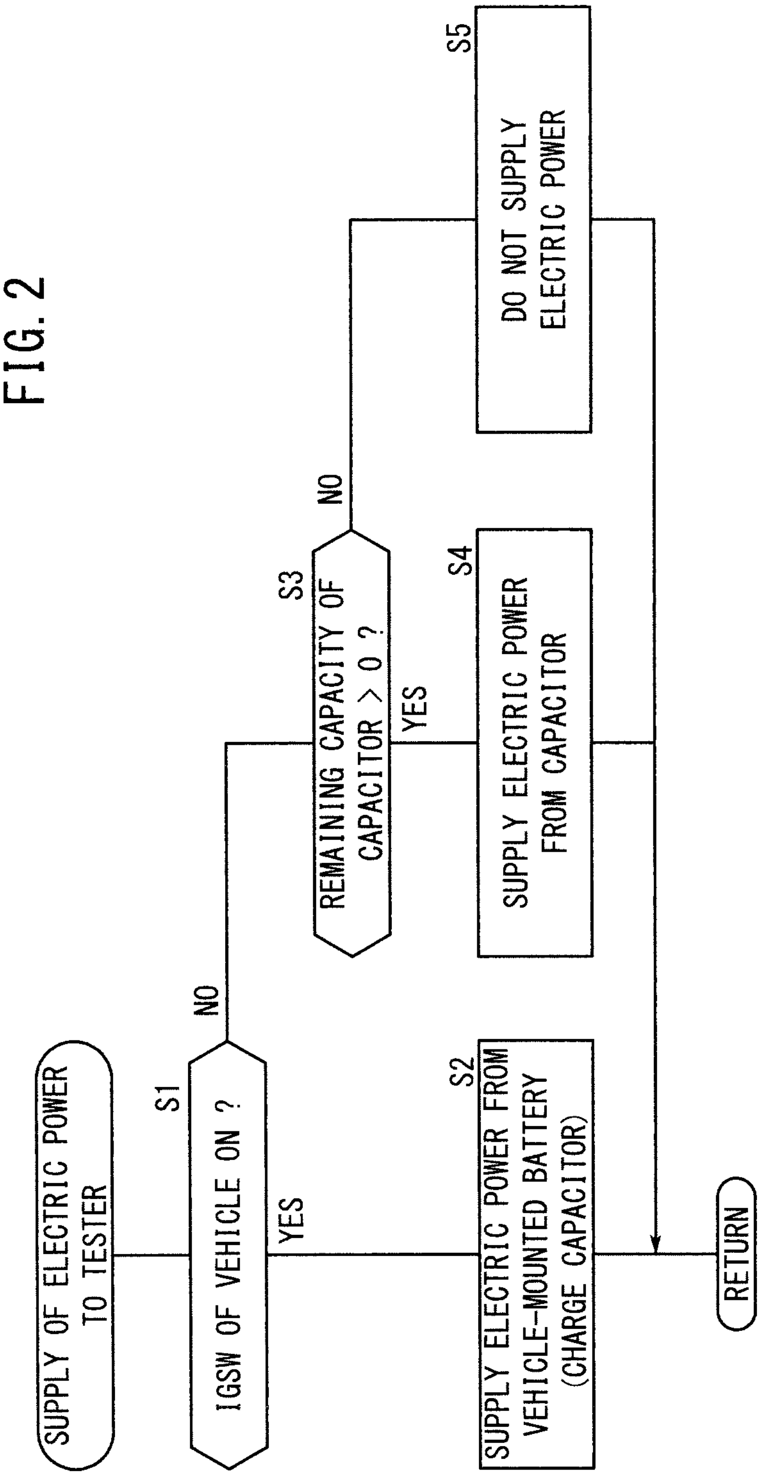
FIG. 2 is a diagram showing an operation sequence in the form of a flowchart for supplying electric power to a tester of the external diagnosing apparatus when a vehicle diagnosis is performed.

FIG. 2 is a diagram showing an operation sequence in the form of a flowchart for supplying electric power to the tester 40 when a vehicle diagnosis is performed. If the IGSW 22 of the vehicle 12 is on (step S1: YES), the vehicle-mounted battery 26 supplies electric power to the tester 40 (step S2). At this time, a portion of the electric power from the battery 26 also is supplied to charge the capacitor 64.

If the IGSW 22 of the vehicle 12 is off (step S1: NO) and if the capacitor 64 has a remaining capacity Qr (i.e., if the remaining capacity Qr is not zero) (step S3: YES), then the capacitor 64 supplies electric power to the various components of the tester 40 (step S4).

If the IGSW 22 of the vehicle 12 is off (step S1: NO) and if the capacitor 64 does not have any remaining capacity Qr (step S3: NO), then electric power is not supplied to the various components of the tester 40 (the tester 40 is off) (step S5).

[3. Operations of Tester 40]

Figure 3:
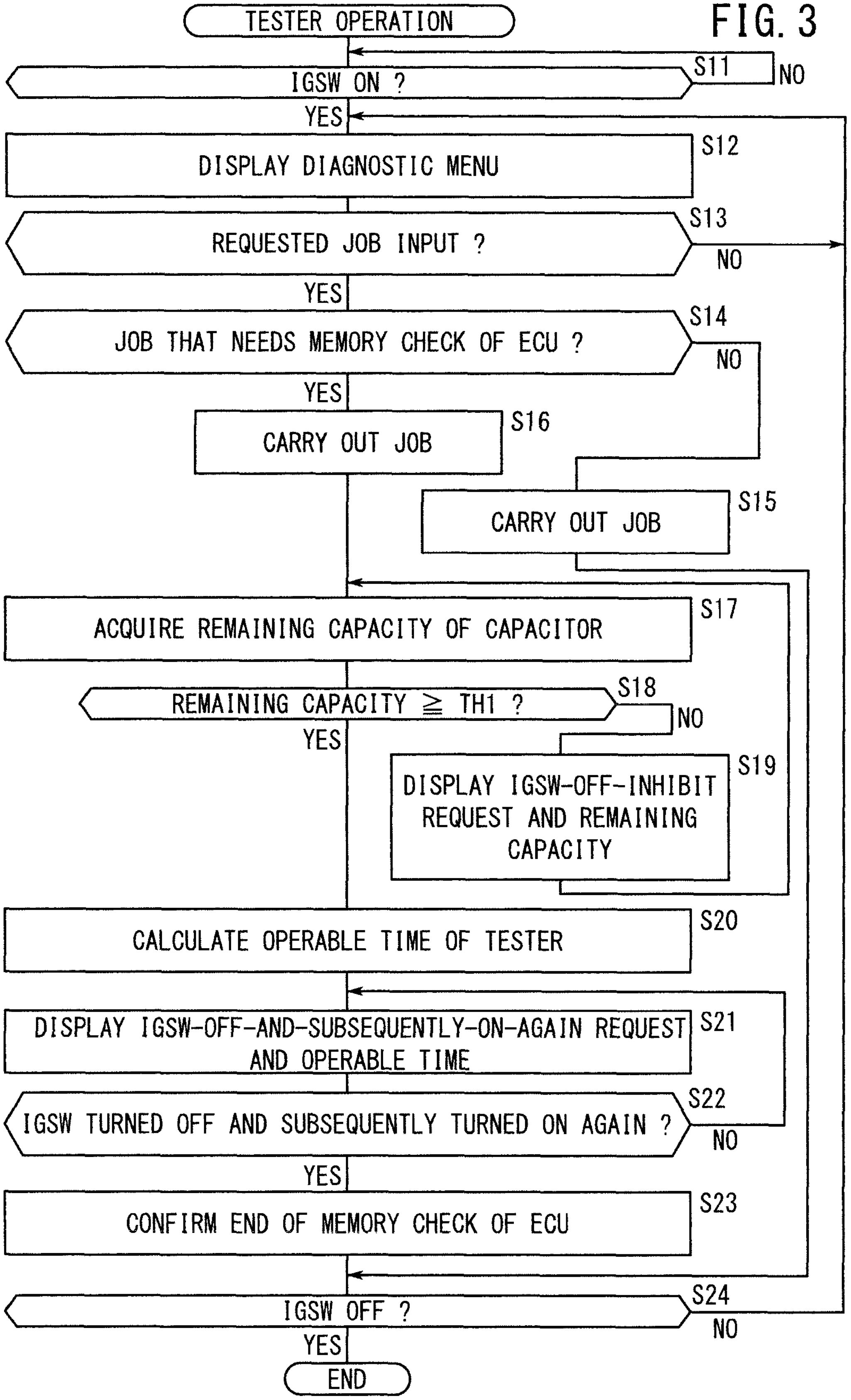
FIG. 3 is a flowchart of an operation sequence of the tester.

FIG. 3 is a flowchart of an operation sequence of the tester 40. For starting the operation sequence shown in FIG. 3, the user (technician) connects the tester-side connector 50 to the vehicle-side connector 28.

If the IGSW 22 is off (step S11: NO), step S11 is looped. If the IGSW 22 is turned on at a time that the tester 40 and the vehicle 12 are connected to each other (step S11: YES), the vehicle-mounted battery 26 supplies electric power to the tester 40 (step S2 of FIG. 2). While electric power is being supplied to the tester 40, in step S12, the processor 58 (job performing function 70) of the tester 40 displays a diagnostic menu, not shown, on the display unit 60. The diagnostic menu includes a plurality of jobs that the user can request the tester 40 to perform (hereinafter referred to as "requested jobs"), and using the diagnostic menu, the user can input a requested job by operating the operating unit 56. The displayed content of the diagnostic menu changes when the operating unit 56 is operated.

If any one of the requested jobs displayed in the diagnostic menu is not selected and no requested job is input (step S13: NO), then control returns to step S12. If any one of the requested jobs is selected and a requested job is input (step S13: YES), control proceeds to step S14.

In step S14, the processor 58 (job performing function 70) judges whether or not the requested job input in step S13 requires a memory check to be conducted by the ECU 20. A memory check is required when data are written to or are erased from the memory 34 of the ECU 20, as well as when programs are rewritten in the memory 34 of the ECU 20. Stated otherwise, a memory check requires that the ECU 20 be restarted.

If the requested job does not require a memory check of the ECU 20 to be performed (step S14: NO), the processor 58 (job performing function 70) carries out the requested job in step S15. If the requested job requires a memory check of the ECU 20 to be performed (step S14: YES), the processor 58 (the job performing function 70) carries out the requested job in step S16.

After completion of the requested job, in step S17, the processor 58 (charged state-related function 80) acquires the remaining capacity Qr of the capacitor 64 from the remaining capacity sensor 66. Next, in step S18, the processor 58 (charged state-related function 80) judges whether or not the remaining capacity Qr acquired in step S17 is equal to or greater than a threshold value TH1 (first threshold value).

The threshold value TH1 is a threshold value for judging whether or not the ECU 20 can be restarted in view of the remaining capacity Qr of the capacitor 64. The threshold value TH1 is set to a value for keeping the tester 40 on for a predetermined sufficient time during a time interval after the IGSW 22 has been turned off and until the IGSW is turned on again. More specifically, if the remaining capacity Qr is equal to or greater than the threshold value TH1, it is possible to keep the tester 40 on for a predetermined time during a time interval after the IGSW 22 has been turned off and until the IGSW 22 is turned on again in order to restart the ECU 20. A grace time after the IGSW 22 has been turned off and until the IGSW 22 is turned on again in order to restart the ECU 20 may be set to a value in a range from 5 to 15 seconds, for example. If the remaining capacity Qr is less than the threshold value TH1, it is possible that the power supply may not be maintained during the time interval after the IGSW 22 has been turned off and until the IGSW 22 is turned on again in order to restart the ECU 20.

The threshold value TH1 according to the present embodiment is 100% although the threshold value TH1 may be set to another numerical value.

If the remaining capacity Qr is less than the threshold value TH1 (step S18: NO), then in step S19, the processor 58 (charged state-related function 80) displays a request for inhibiting the IGSW 22 from being turned off (hereinafter referred to as an "IGSW-off-inhibit request") together with the remaining capacity Qr acquired in step S17 on the display unit 60.

Figure 4:
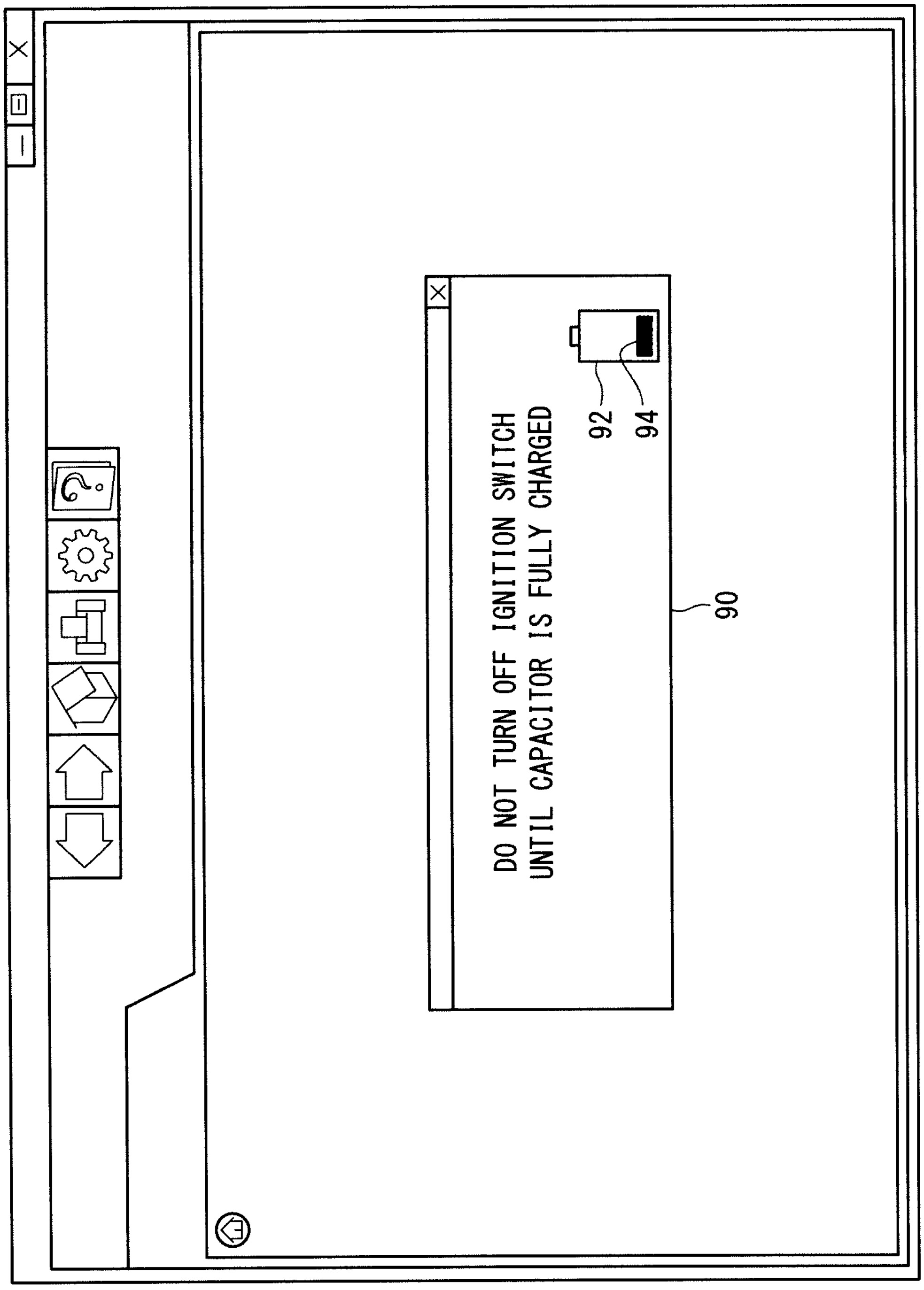
FIG. 4 is a view showing by way of example a screen that displays a request for inhibiting an ignition switch from being turned off, and also displays the remaining capacity of a capacitor.

FIG. 4 is a view showing by way of example a screen that displays the IGSW-off-inhibit request, and also displays the remaining capacity Qr. In FIG. 4, the message "DO NOT TURN OFF IGNITION SWITCH UNTIL CAPACITOR IS FULLY CHARGED" represents the IGSW-off-inhibit request that is displayed in a display frame 90. An animation display image 92 having the contour of a cell represents the remaining capacity Qr. More specifically, a black area (hereinafter referred to as a "remaining level graduation 94"), which is displayed in the contour of the cell, indicates the remaining capacity Qr in one of four levels. For example, if the remaining capacity Qr is 100%, the contour of the cell is filled with four remaining level graduations 94, and if the remaining capacity Qr is 0%, a remaining level graduation 94 is not displayed in the contour of the cell.

After step S19, control returns to step S17. Consequently, the screen by which the inhibition of operation was requested, as shown in FIG. 4, continues to be displayed until the remaining capacity Qr of the capacitor 64 becomes equal to or greater than the threshold value TH1. As the remaining capacity Qr increases, the number of remaining level graduations 94 also increases.

If the remaining capacity Qr becomes equal to or greater than the threshold value TH1 (step S18: YES), then in step S20, the processor 58 (tester operable time-related function 82) calculates an operable time Tc of the tester 40. For example, the processor 58 (tester operable time-related function 82) calculates an operable time Tc from the amount of electric power (estimated value or measured value), which is consumed by the tester 40 as a whole, and the remaining capacity Qr of the capacitor 64. If the amount of electric power consumed by the tester 40 as a whole can be estimated, then it is possible for the processor 58 (tester operable time-related function 82) to determine an operable time Tc from a relationship between the estimated amount of consumed electric power and the threshold value TH1. In this case, the process of step S20 may be omitted.

Next, in step S21, the processor 58 (tester operable time-related function 82) displays on the display unit 60 a request for turning off the IGSW 22 and for subsequently turning on the IGSW 22 again (hereinafter referred to as an "IGSW-off-and-subsequently-on-again request"), together with the operable time Tc that was calculated in step S20.

Figure 5:
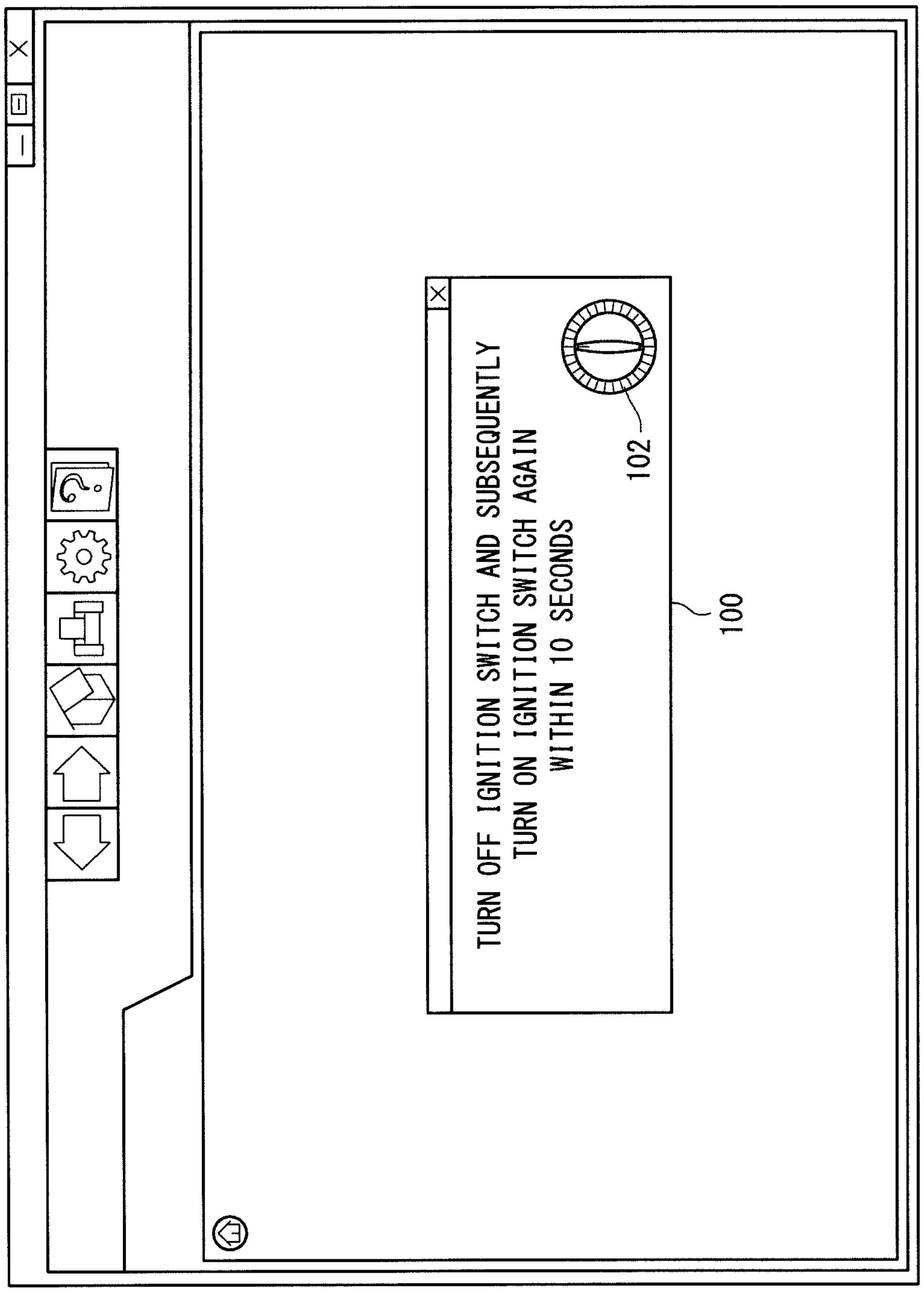
FIG. 5 is a view showing by way of example a screen that displays a request for turning off the ignition switch and subsequently turning on the ignition switch again, and also displays a time for which the tester can be operated.

FIG. 5 is a view showing by way of example a screen that displays the IGSW-off-and-subsequently-on-again request together with the operable time Tc. In FIG. 5, the message "TURN OFF IGNITION SWITCH AND SUBSEQUENTLY TURN ON IGNITION SWITCH AGAIN" that is displayed in a display frame 100 represents the IGSW-off-and-subsequently-on-again request. The message "WITHIN 10 SECONDS" represents the operable time Tc. The display frame 100 also includes an illustration 102 of a timer.

In the illustration 102 of the timer, the pointer position of the timer may be changed depending on the operable time Tc that was calculated in step S20. The pointer position of the timer may be changed depending on a subsequent change in the operable time Tc.

If the IGSW is not turned off and subsequently turned on again, regardless of the displayed IGSW-off-and-then-on-again request (step S22: NO), control returns to step S21.

The displayed operable time Tc after the IGSW 22 has been turned off and until the IGSW 22 is turned on again may be reduced as time progresses. For example, the characters "REMAINING TIME IS X SECONDS" may be displayed.

The operable time Tc that has been reduced may be calculated by detecting when the IGSW 22 is turned off, and measuring with a timer a time after the IGSW 22 has been turned off. Turning-off of the IGSW 22 may be detected when the remaining capacity Qr turns from an increasing or constant trend to a decreasing trend, or when the remaining capacity Qr decreases at a rate in excess of a predetermined value. Alternatively, turning-off of the IGSW 22 may be detected by continuously detecting the remaining capacity Qr with the remaining capacity sensor 66, or by continuously calculating the operable time Tc from the remaining capacity Qr.

If the threshold value TH1 is of a value that is less than 100%, the display of the operable time Tc may be changed depending on an increase in the remaining capacity Qr of the capacitor 64, and depending on an accompanying increase in the operable time Tc of the tester 40.

If the IGSW 22 is turned off and subsequently turned on again (step S22: YES), then in step S23, the processor 58 (ECU restart-related function 72) communicates with the ECU 20 and confirms completion of the memory check.

Thereafter, if the IGSW 22 is not turned off (step S24: NO), control returns to step S12.

If the IGSW 22 is turned off (step S24: YES), the power supply of the tester 40 is turned off, whereupon the operation of the tester is completed. At this time, electric power stored in the capacitor 64 may be discharged through a non-illustrated discharging resistor or the like.

If the ECU 20 is not suitably restarted, and hence an attempt to restart the ECU 20 needs to be repeated, the IGSW 22 may be turned off once, and the processing sequence from step S17 may be carried out again. At this time, the ECU restart-related function 72 of the processor 58 may detect the restart failure of the ECU 20 through communications with the ECU 20, and may display a message, which indicates that the ECU 20 needs to be restarted since the ECU was not suitably restarted, on the display unit 60.

[4. Advantages of the Present Embodiment]

According to the present embodiment, as described above, when the IGSW 22 is on, the vehicle-mounted battery (vehicle-mounted power supply) supplies electric power to the tester 40 of the external diagnosing apparatus 14. Therefore, it is not necessary for a normal use power supply to be included in the tester 40 per se, thereby making it possible to reduce the size, weight, and cost of the tester 40. When the IGSW 22 is off, electric power stops being supplied from the battery 26 to the tester 40. Further, when the IGSW 22 is off, the ECU 20 also is turned off, and at this time, the tester 40 typically does not acquire sensor detected values from the vehicle 12 and does not perform a vehicular diagnosis. Consequently, when the IGSW 22 is off, supply of electric power from the battery 26 to the tester 40 is stopped, thereby making it possible to efficiently reduce consumption of electric power of the battery 26.

Furthermore, according to the present embodiment, the tester 40 includes the capacitor 64, which is charged with electric power from the battery 26 when the IGSW 22 is on, and supplies the charged electric power to the tester 40 after the IGSW 22 has been turned off. Therefore, when the IGSW 22 is turned off at the end of a process of collecting data from the vehicle 12, the process of writing data into the tester 40 is continued until the process is finished, because the tester 40 keeps operating for a predetermined period of time (e.g., ranging from 10 seconds to 15 seconds).

In the case that the tester 40 is operated only during a temporary time interval after the IGSW 22 has been turned off and until the IGSW 22 is subsequently turned on again in order to restart the ECU 20, if the time interval after the IGSW 22 has been turned off and until the IGSW 22 is subsequently turned on again is unduly long, supply of electric power from the capacitor 64 tends to be stopped during a period in which the IGSW 22 is off, thereby turning the tester 40 off. In this case, even if supply of electric power to the tester 40 is resumed by subsequently turning on the IGSW 22, time is required for restarting the tester 40, thus resulting in an interruption of the process as a whole. In contrast, according to the present embodiment, if a job requested on the tester 40 of the external diagnosing apparatus 14 is a memory-related job that needs to activate a memory check program of the ECU 20, then the operable time Tc is displayed as an operation interval time limit (which is set in a range of the operable time Tc of the tester 40 that is determined from the remaining capacity Qr of the capacitor 64) after the IGSW 22 has been turned off and until the IGSW 22 is subsequently turned on again at the time of completion of the requested job. Consequently, the user is prompted to turn off the IGSW 22 and subsequently turn on the IGSW 22 again (in order to restart the ECU 20) before supply of electric power from the capacitor 64 is stopped, thereby making it possible to promote smooth continuation of the job.

According to the present embodiment, the remaining capacity Qr of the capacitor 64 at the time of completion of the requested job is detected, and if the remaining capacity Qr is less than the threshold value TH1 (first threshold value), a message for inhibiting the IGSW from being turned off is displayed until the capacitor 64 has been charged to the threshold value TH1 or greater (FIG. 4). Accordingly, during a time interval after the IGSW 22 is initially turned on and until the capacitor 64 is charged to the threshold value TH1 or greater, it is possible to prompt the user not to turn off the IGSW 22 and to turn on the IGSW 22 for restarting the ECU 20. In addition, if the capacitor 64 has been discharged, thus causing a shortage of the remaining capacity Qr, it is possible to advise the user against turning off the IGSW 22 until the capacitor 64 has been charged to the threshold value TH1 or greater, when the ECU 20 is not suitably restarted and hence an attempt to restart the ECU 20 needs to be repeated. It is thus possible to reduce the risk of interrupting the job for restarting the tester 40 after the tester 40 has been turned off, due to the fact that supply of electric power from the capacitor 64 is stopped while the IGSW 22 is off.

According to the present embodiment, after completion of the requested job, the remaining capacity Qr of the capacitor 64 is detected continuously or intermittently, and display of the operable time Tc is changed depending on a change in the remaining capacity Qr. Thus, it is possible to display the operable time Tc depending on a change in the remaining capacity Qr. Consequently, the user can be prompted to recognize a change in the operable time Tc of the tester 40.

According to the present embodiment, after the IGSW 22 has been turned off, the displayed operable time Tc is reduced as the operable time Tc decreases. Therefore, after the IGSW 22 has been turned off, it is possible for the user to accurately grasp the operable time Tc as the operable time Tc decreases.

B. Modifications

The present invention is not limited to the above embodiment, and the present invention may employ various arrangements based on the disclosure of the present description. For example, the present invention may employ the following arrangements.

[1. Diagnostic Target (Vehicle 12)]

The vehicle 12 according to the above embodiment is a gasoline vehicle. However, the vehicle, which is capable of being diagnosed by the external diagnosing apparatus 14, may be a diesel engine vehicle, an electric automobile, a hybrid vehicle, or the like.

Similarly, although the vehicle 12 according to the present embodiment is illustrated as a motorcycle, the vehicle, which is capable of being diagnosed by the external diagnosing apparatus 14, may be a three-wheeled vehicle, a four-wheeled vehicle, a six-wheeled vehicle, or the like.

In the above embodiment, the battery 26 is used as a vehicle-mounted power supply for supplying electric power to the tester 40. However, the power supply that starts and stops supply of electric power to the tester 40 when the IGSW 22 is turned on and off is not limited to the battery 26. For example, a capacitor, which differs from the capacitor 64 of the tester 40, may be used as a vehicle-mounted power supply.

[2. Configuration of External Diagnosing Apparatus 14]

According to the above embodiment, diagnostic software that is used by the tester 40 or a rewriting program for the ECU 20 is stored in advance in the memory 59 of the tester 40. However, if the tester 40 includes a wireless communications function, then the diagnostic software or the rewriting program may be downloaded from the PC 42 or an external source, e.g., an external server, which can communicate with the tester 40 via a public network.

According to the above embodiment, the capacitor 64 is included as a built-in device in the tester 40 (see FIG. 1). However, the capacitor 64 may be connected as an external device to the tester 40.

[3. Supply of Electric Power]

According to the above embodiment, the IGSW 22 per se is connected to the vehicle-side electric power line that interconnects the vehicle-mounted battery 26 and the tester 40 (FIG. 1), and the IGSW 22 is used to selectively start and stop supply of electric power from the vehicle-mounted battery 26 to the tester 40 (FIG. 2). However, the IGSW 22 per se need not necessarily be connected to the vehicle-side electric power line 36, insofar as the vehicle-mounted battery 26 is capable of starting and stopping supply of electric power to the tester 40 in relation to turning on and off the IGSW 22. For example, another switch may be connected to the electric power line 36, which is turned on and off in ganged relation to the IGSW 22.

[4. Requested Job]

According to the above embodiment, the user inputs a requested job through the operating unit 56, which is included as part of the tester 40 and is operated by the user. Insofar as the user inputs a requested job to the tester 40, the user may input the requested job in other ways. For example, if the tester 40 includes a wireless communications function, the user may input a requested job from an external device, e.g., the PC 42, to the tester 40.

[5. ECU Restart-Related Control]

According to the above embodiment, the threshold value TH1, which is compared with the remaining capacity Qr of the capacitor 64, is 100%. However, the threshold value TH1 may be another numerical value, e.g., a numerical value in a range from 50% to 99%, insofar as the tester 40 is kept on during the time interval after the IGSW 22 has been turned off and until the IGSW 22 is subsequently turned on again in order to restart the ECU 20.

Assuming that the threshold value TH1 is 100%, if the remaining capacity Qr becomes equal to or greater than the threshold value TH1 (step S18: YES in FIG. 3), it is possible to keep the operable time Tc to a single fixed value. In this case, the process of calculating the operable time Tc may be omitted.

According to the present embodiment, after completion of the requested job, the IGSW-off-inhibit request and the remaining capacity Qr of the capacitor 64 are displayed until the remaining capacitor Qr becomes equal to or greater than the threshold value TH1 (step S19 in FIG. 3, FIG. 4). In this case, attention may be focused on the operable time Tc, or the operable time Tc may be displayed in addition to or instead of the IGSW-off-inhibit request and the remaining capacity Qr.

According to the above embodiment, after step S20 of FIG. 3, the operable time Tc is displayed until the IGSW is turned on again. However, after completion of the requested job, the operable time Tc may be displayed at any time until the IGSW 22 is turned on again. For example, after step S20 of FIG. 3, the operable time Tc may be displayed only for a certain time that is shorter than the operable time Tc. Alternatively, after completion of the requested job, the operable time Tc may be displayed before the IGSW 22 is turned off. Alternatively, the operable time Tc may be displayed only during the time interval after the IGSW 22 has been turned off and until the IGSW 22 is subsequently turned on again. Further, alternatively, the operable time Tc may be displayed when the remaining capacity Qr becomes equal to or greater than a predetermined threshold value TH2 (second threshold value). The threshold value TH2 may be set to a value that is greater than, less than, or equal to the threshold value TH1.

According to the above embodiment, the operable time Tc is displayed without modification on the display unit 60 (step S21 of FIG. 3, FIG. 4). However, insofar as the IGSW 22 is turned off and turned on again in order to restart the ECU 20 within a predetermined time interval, which is equal to or less than the operable time Tc, only a time limit for turning on the IGSW 22 again after the IGSW has been turned off (hereinafter referred to as an "operation interval time limit Tlim") may be displayed. For example, a time that is shorter than the operable time Tc in relation to the threshold value TH1 may be displayed as the operation interval time limit Tlim. The operation interval time limit Tlim includes the operable time Tc.

According to the above embodiment, as shown in FIG. 5, the operable time Tc is displayed as a numerical value. However, in the illustration 102, the operable time Tc may be displayed only as a pointer position of the timer. Alternatively, the operable time Tc may be displayed by way of other display modes.

[6. Other Features]

According to the above embodiment, the present invention is applied to the external diagnosing apparatus 14, and particular, the tester 40 thereof. However, insofar as electric power is usually supplied from the vehicle-mounted power supply, and electric power is supplied from the built-in or external capacitor 64 when the ECU 20 is restarted, the present invention also may be applied to a program rewriting apparatus having a program rewriting function for the ECU 20 that is mounted on the vehicle 12.

The invention claimed is:

1. An external diagnosing apparatus for performing data communications with an electronic control unit, hereinafter referred to as an ECU, mounted on a vehicle from outside of the vehicle, acquiring sensor detected values of the vehicle through the ECU, and diagnosing the vehicle, comprising:

an external-diagnosing-apparatus-side electric power line connected to a vehicle-side electric power line, the vehicle-side electric power line configured to supply electric power from a vehicle-mounted power supply to the external diagnosing apparatus when an ignition switch of the vehicle is on, and configured to stop supply of electric power from the vehicle-mounted power supply when the ignition switch is off;

a capacitor being connected to the external-diagnosing-apparatus-side electric power line and storing electric power, the capacitor being charged with the electric power from the vehicle-mounted power supply when the ignition switch is on, and supplying the charged electric power to the external diagnosing apparatus after the ignition switch has been turned off;

a requested job input unit having input thereto a requested job for the external diagnosing apparatus;

a memory-related job judging section configured to judge whether or not the requested job input to the requested job input unit is a memory-related job that needs to activate a memory check program of the ECU; and a time limit display unit configured to display an operation interval time limit after the ignition switch has been turned off and until the ignition switch is subsequently turned on again in order to restart the ECU, in a case that the memory-related job judging section judges that the requested job is the memory-related job and in a case that the requested job is finished.

2. The external diagnosing apparatus according to claim 1, wherein a remaining capacity or a charging rate of the capacitor is detected when the requested job is finished, and in a case that the charging rate or the remaining capacity is less than a first threshold value, a message for inhibiting the ignition switch from being turned off is displayed until the capacitor has been charged to the first threshold value or greater.

3. The external diagnosing apparatus according to claim 1, wherein the operation interval time limit is variable depending on an operable time of the external diagnosing apparatus, which is determined from the remaining capacity or the charging rate of the capacitor; and after completion of the requested job, the remaining capacity or the charging rate of the capacitor is detected continuously or intermittently, and display of the operation interval time limit is changed depending on a change in the remaining capacity or the charging rate.

4. The external diagnosing apparatus according to claim 3, wherein after the ignition switch has been turned off, the display of the operation interval time limit is changed as the operable time decreases.

5. A vehicle diagnosing system for performing data communications between an electronic control unit, hereinafter referred to as an ECU, mounted on a vehicle and an external diagnosing apparatus, so that the external diagnosing apparatus acquires sensor detected values of the vehicle from the vehicle and diagnoses the vehicle;

wherein electric power is supplied from a vehicle-mounted power supply of the vehicle to the external diagnosing apparatus when an ignition switch of the vehicle is on, and supply of electric power from the vehicle-mounted power supply is stopped when the ignition switch is off; and wherein the external diagnosing apparatus has:

a capacitor configured to store electric power, the capacitor being charged with the electric power from the vehicle-mounted power supply when the ignition switch is on, and supplying the charged electric power to the external diagnosing apparatus after the ignition switch has been turned off; and a display unit configured to display a warning in order not to turn off the ignition switch under a condition in which the ignition switch is required to be turned off to restart the ECU, depending on a remaining capacity or a charging rate of the capacitor when the ignition switch is on.

6. A vehicle diagnosing method of performing data communications between an electronic control unit, hereinafter referred to as an ECU, mounted on a vehicle and an external diagnosing apparatus, so that the external diagnosing apparatus acquires sensor detected values of the vehicle from the vehicle and diagnoses the vehicle, comprising:

supplying electric power from a vehicle-mounted power supply to the external diagnosing apparatus, and charging a capacitor of the external diagnosing apparatus, when an ignition switch of the vehicle is on;

stopping supply of electric power from the vehicle-mounted power supply to the external diagnosing apparatus, and supplying electric power from the capacitor to the external diagnosing apparatus, when the ignition switch is off;

accepting a requested job by the external diagnosing apparatus;

judging by the external diagnosing apparatus whether or not the accepted requested job is a memory-related job that needs to activate a memory check program of the ECU;

carrying out the requested job by the external diagnosing apparatus; and displaying, on a display unit of the external diagnosing apparatus, an operation interval time limit, which is a time limit after the ignition switch has been turned off and until the ignition switch is subsequently turned on again in order to restart the ECU, in a case that the requested job is judged as the memory-related job and that the requested job is finished, and which is a time set in a range of an operable time of the external diagnosing apparatus that is determined from a remaining capacity or a charging rate of the capacitor.

* * * * *